United States Patent [19]

Lill

[11] 4,075,770
[45] Feb. 28, 1978

[54] METRIC SYSTEM TEACHING AND MEASURING DEVICE

[76] Inventor: Deryl L. Lill, 107 San Marcos, Fenton, Mo. 63026

[21] Appl. No.: 655,095

[22] Filed: Feb. 4, 1976

[51] Int. Cl.² .................. G09B 19/02; G01N 9/00
[52] U.S. Cl. .................................. 35/30; 35/19 R; 35/34; 73/448
[58] Field of Search .............. 35/30, 34, 19 R; 73/32 R, 32 A, 437, 444, 447, 448, 450

[56] References Cited

U.S. PATENT DOCUMENTS

| | | | |
|---|---|---|---|
| 1,399,394 | 12/1921 | Mond | 73/437 |
| 1,524,928 | 2/1925 | Hardel et al. | 73/450 X |
| 1,964,145 | 6/1934 | Edelmann | 73/448 |
| 2,647,394 | 8/1953 | Schaeperklaus | 73/32 R |
| 3,055,220 | 9/1962 | Ryan et al. | 73/448 X |

OTHER PUBLICATIONS

Stansi Scientific Division, Fisher Scientific Co. Catalog, pp. 73–75.
Welch Scientific Co. Catalog; pp. 39, 40.

*Primary Examiner*—William H. Grieb
*Attorney, Agent, or Firm*—Glenn K. Robbins

[57] ABSTRACT

A metric system teaching and measuring device. The device is in the form of a tubular meter stick having an internal cross sectional area of ten square centimeters producing the volume of one liter for one meter length of the stick. An attachable base provides means for closing the bottom of the stick to form a graduate cylinder. Markings provided through a one meter ruler having centimeter and millimeter markings enable the reading of volume corresponding to centiliters and milliliters respectively. In the graduate form the device may contain a 1 kilogram mass of water with each cubic centimeter or milliliter of water corresponding to 1 gram. By the use of a float the device can be used to determine the mass (or weight) of small objects heavier than the displaced fluid such as water when the object is placed inside the float using known mass of the float as tare. For lighter than water objects the mass can be simply determined by reading the displaced fluid on the graduate markings by taking a reading before and after object is placed in the fluid. The density may then be ascertained by immersing the object in water in the graduate to obtain the volume and dividing the weight by the volume to yield the density. It is understood that specific gravity is the same as density when units of gm/cm³ or kg/l are omitted.

8 Claims, 10 Drawing Figures

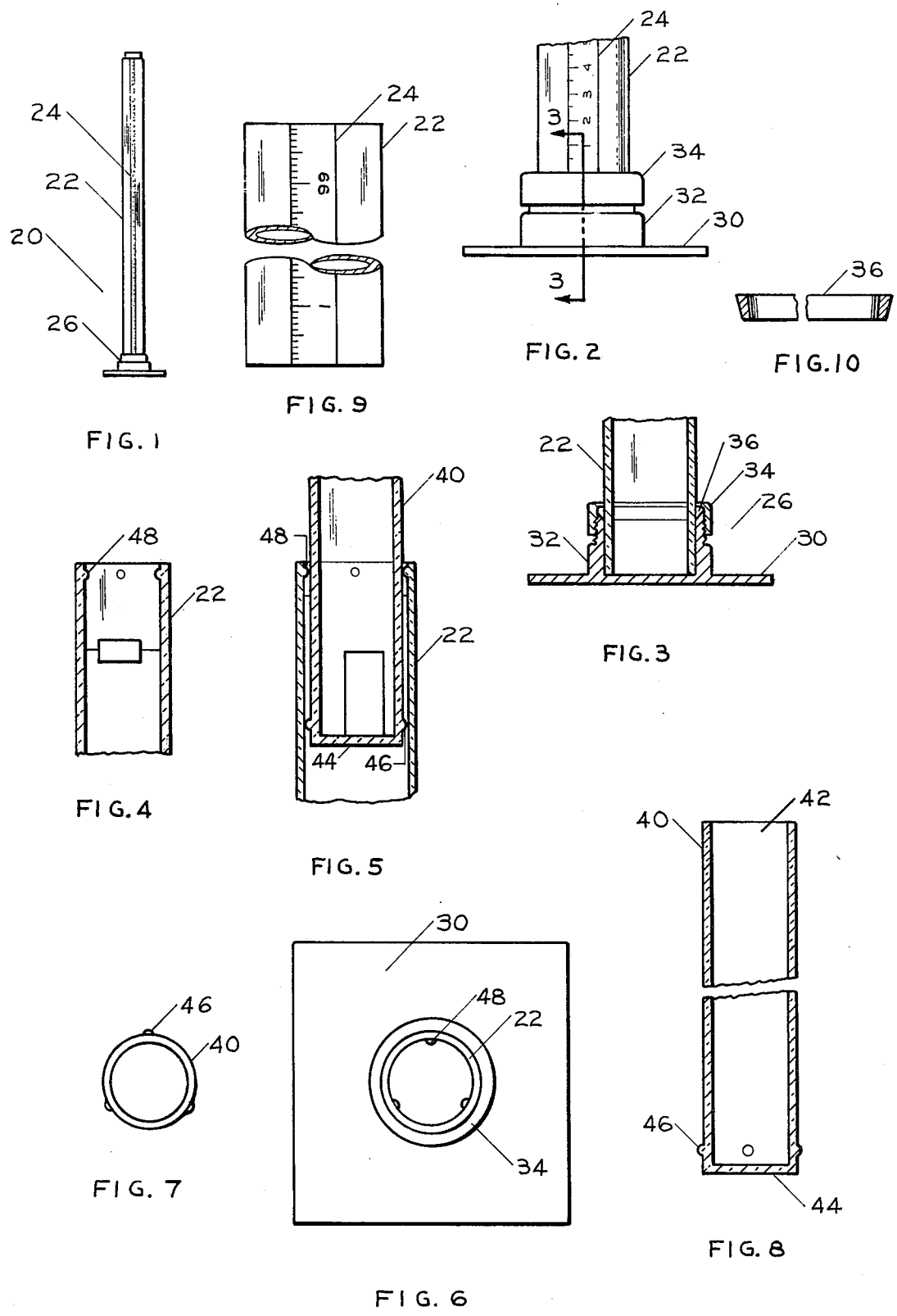

METRIC SYSTEM TEACHING AND MEASURING DEVICE

SUMMARY OF THE INVENTION

By means of this invention there has been provided a simple teaching device making the understanding of the metric system quite simple. The device can be used as a one meter ruler for linear measure and can also be employed as a graduate by filling the tube when closed at the bottom whereby colometric measurements can be simply obtained. The cross sectional area of the interior tube is specially designed to be ten square centimeters. Thus the entire volume of the graduate when filled with liquid will provide one liter which by definition is 1,000 milliliters or cubic centimeters, the latter two terms being used interchangeably herein for simplicity. This simple relationship providing a ready correlation between volume and length in the graduate cylinder makes the understanding of the theory and practice of the metric system readily available to students and those unfamiliar with the metric system. Further the device can be practically used for obtaining density, specific gravities, linear measurements and determination of volume.

The teaching device is of special use in the current transition from the English measure system to the metric system. By providing a graduate cylinder of one meter length of height marked in 100 centimeter (markings) with the cross section of 10 square centimeters the relationship between mass, volume and linear measurement can be readily understood by those unfamiliar with the metric system.

The specific gravity determination of objects both heavier and lighter than the displaced fluid is further readily taught by the teaching device. For the purpose of ease in description this will be more readily explained with regard to the use of water as the fluid used. However it will be appreciated that any type of fluid can be used as desired. The determination of specific gravity of an object lighter than water is very simply effected by placing the object in the graduate cylinder and measuring the volume displaced which by Archimedes principle provides the mass in grams per cubic centimeter ($cm^3$) or milliliter (ml) of displaced water. The total volume is then measured by totally immersing the object in the water. The density is then readily determined by dividing the weight of the volume. For objects heavier than water the specific gravity is measured by placing the object in a float placed in the graduate cylinder. The weight of the float is used as a tare and the volume of water displaced is used to obtain the weight of the object after subtracting the tare. The object is then placed directly in the fluid and the volume is determined. The density or specific gravity is then obtained in the usual manner as described above. Special guide means are used on the float to prevent tilting and to maintain the float in vertical position so that it may readily rise and fall within the graduate cylinder and remain buoyant.

The tubular meter stick is simply designed to be open on both ends so that it may be used as a meter stick measure in a wide variety of uses. When desired to be used as a volumetric measure or for the determination of weight and specific gravities it is simply connected to a sealing base which provides a closed bottom and a substantial flat base in order that the device can be supported in a vertical position upon a table, bench or any other flat surface. Thus adaptability of the teaching device is provided whereby it may be used in a simply form as a linear measure to determine lenght or by attachment to the base for the measuring the volume, mass, specific gravities and the like.

The above features are objects of this invention and further objects will appear in the detailed description which follows and will otherwise be apparent to those skilled in the art.

For the purpose of illustration of this invention there is shown in the accompanying drawing a preferred embodiment thereof. It is to be understood that these drawings are for the purpose of illustration only and that the invention is not limited thereto.

In the drawings:

FIG. 1, is a view in front elevation of the teaching device.

FIG. 2, is an enlarged fragmentary view in front elevation of the bottom of the device.

FIG. 3, is a view in section taken on the line 3—3 of FIG. 2.

FIG. 4, is an enlarged fragmentary view in cross section of the upper part of the device showing the determination of specific gravity of an object lighter than the displaced fluid.

FIG. 5, in view taken similarly to FIG. 4, but showing the use of the float for determining the specific gravity of an object heavier than the displaced fluid.

FIG. 6, is an enlarged top plan view of the teaching device.

FIG. 7, is an enlarged top plan view of the float.

FIG. 8, is an enlarged view in axial section of the float.

FIG. 9, is a further enlarged broken apart view in front elevation of the fluid containing tube or stick and the metric scale.

FIG. 10, is an enlarged fragmentary view in axial cross-section taken through the sealing ring used in the base.

DESCRIPTION OF THE INVENTION

The teaching device of this invention is generally referred to by the reference numeral 20 in FIG. 1. As there shown it is comprised of a tubular stick 22 in the form of a tube having a one meter measure 24 readily visible on the side. A sealing base 26 is removably provided at the bottom. The tubular stick 22 is best shown in FIGS. 2, 3 and 9. As there shown it is simply formed of a rigid transparent plastic tube 22 open at both ends. It is made of clear plastic for ready visibility of the interior contents. A one meter tape measure 24 is provided at the side extending from the bottom of the tube to the top. This one meter measure is marked in 100 major divisions, each 1 centimeter in length with ten millimeter markings therebetween.

The base 26 and its components are best shown in FIGS. 2, 3, 6 and 10. The base has a flat portion 30 providing a stable support for the teaching device. A socket 32 closely receives the tubular stick for support therein. In order to provide for sealing and locking of the end of the tubular stick in the base a threaded collar 34 is provided which has female threads engageable with male threads of the socket 32. A sealing ring 36 fits between the end of the threaded portion of the socket 32 and the collar such that by threaded engagement of the collar on the socket 32, the sealing ring is compressed and constricted to lock and seal the tubular stick. When so locked and sealed the tubular stick can be used as a graduate cylinder and filled with water or other fluid as desired without the possibility of leakage.

For the measurement of a small object having a specific gravity greater than water a float 40 is provided. This float is in the form of a tube like member having an open top 42 and a closed bottom 44. Guide elements in the form of protrubences 46 are provided around the periphery of the bottom of the float. Three such guide elements are shown but it will be understood that more may be employed as desired. Further guide elements 48 are provided on the interior of the tubular stick and are of approximately the same radial length as the guides 46. The combination of the guide elements on the interior of the tubular stick and the exterior of the float maintain the float in the vertical position as shown in FIG. 5 in order that the float may rise and fall without tilting or adhering to the interior side walls of the stick when used in the measurement of mass and determination of specific gravity of objects heavier than water.

USE

The teaching device of this invention is very simply employed in use for linear measurements, and for determination of mass, volume and specific gravity. For the determination of linear measurements the tubular stick 22 can be used without the base 26 as a one meter stick similar to the yard stick in the English system of measure. The one meter tape measure 24 provided on the tubular stick is divided into one hundred major centimeter markings making up the 1 meter in length. The further subdivisions of 1 millimeter provide a meter stick for the measurement of various items to be measured in millimeters, centimeters and meters.

The teaching device is readily converted for determination of volumes. For such determinations the meter stick 22 is attached to the base 26 in sealing relationship. This is effected by inserting the bottom of the tubular stick in the socket 32 and then tightening the collar 34 to constrict the sealing ring 36 in tight sealing relation around the tubular stick. The tubular stick has an internal cross-sectional area of 10 square centimeters and a height of 1 hundred centimeters constituting 1 meter or 1 thousand millimeters. Thus the total volume is found by multiplying the cross-sectional area of 10 square contimeters by the height of 1 hundred centimeters to provide a volume of 1 thousand cubic centimeters which by definition is of course 1 liter.

The volume of a small object which must be of a size to fit in the tubular stick is simply determined by partially filling the tubular stick with water. The object is then submerged within the water such as by pushing it under water with a pencil or the like and the increase in reading of the liquid level is read. The volume is obtained in cubic centimeters by subtracting the difference in the liquid level reading before and after submersion of the object from the tape measure 24 reading in millimeters or multiplying the centimeter reading by 10.

For determination of volume of a sample of fluid the meter stick is emptied of liquid and then filled with the liquid to be measured. The volume is read off directly from the measure 24 on the meter stick with centimeters corresponding to centiliters.

For the determination of mass and specific gravity where the liquid employed is water, the teaching device is very simply employed for such determination using small objects fitting within the tubular stick. Light objects, i.e. lighter than water are placed directly in water in the tube. The float 40 is employed for objects that are heavier then water.

For objects that are lighter than water the well-known Archimedes principle is employed, namely that an object that floats will displace a volume of water equal to its own weight or mass. Thus, using the tubular stick partially filled with water there can be added any small object that will float and the water level will rise in an encrement to indicate the weight in the number of grams. This increment is determined by taking the reading of the fluid level before and after the addition of the object is read off directly in millimeters at the side of the tube in the measure 24. Once the weight has been determined the volume is obtained by totally submerging the object in water by pushing down with a pencil, stick or the like so that the top of the object is below the surface of the liquid level. The volume can be read off directly in the same manner as previously described by taking readings of the liquid level in millimeters before and after submersion. The difference in readings provides the volume in cubic centimeters. The specific gravity is simply determined by dividing the mass in grams by the volume in $cm^3$ and dropping the units of $gm/cm^3$. Thus for an object weighing 5 grams and having a volume of 10 $cm^3$, the specific gravity would be 0.5.

For the determination of mass and specific gravity of objects heavier than water the float 40 is employed. In this determination the mass or weight of the float may be marked on the float for ready convenience, as for purpose of example 20 grams. Where the mass is not known the weight is simply determined by ascertaining the volume of water which is displaced in the tube or graduate. Thus if 20 cc is displaced the weight of the float is 20 grams.

The heavier than water object is then placed in the float to determine the total amount of water displaced. Total measurement of water displaced is then used to determine the mass of the heavier than water object. The weight of the float as 20 grams for example is in the nature of tare and is subtracted from the total mass of the total displaced water to provide the mass of the object. Once this total mass is determined for the object its specific gravity is simply obtained by finding the volume of the heavier than water object. This is determined by submerging the object in water in the liquid tube and reading off directly the amount of water displaced while remembering that for each millimeter on the measure there is a correspondence to 1 cubic centimeter of volume and 1 gram of mass where water is employed. When the volume is determined, the density of the object is found by dividing the mass or the weight of the object by the displaced volume. For example where the object has a volume of 50 cc and weighs 100 grams the specific gravity is 2.0 $gr/mc^3$.

The tubular meter stick lends itself to construction in various forms. Thus instead of being in the form of a circular cross-section it can be in the form of a rectangular tube having for example a square cross-section. Likewise, where desired, additional tape measures can be employed for convenience using an English measure yard stick for ready reference and comparison to the 100 centimeter measure. Likewise an additional measure may be employed having numerals directly in terms of millimeters reading a total of 1000 millimeters rather than 100 centimeters to obviate the necessity of multiplying the centimeters on the scale by 10 to obtain the millimeters.

Such change and other modifications may be made within this invention as will readily apparent to those skilled in the art. These changes and modifications are within the scope and teaching of this invention as defined by the claims appended hereto.

What is claimed is:

1. A device for teaching and use of metric measurements comprising an elongated tube having opposed open ends, said tube having a uniform cross-section area of 10 square centimeters and a length of one meter, means for closing said tube at a first end, a scale extending from said first end to a second open end, said scale starting at zero at the first end and ending at 100 centimeters at the second open end whereby the tube may be used as a linear measure and a volumetric measure to indicate volume in milliliters at scale measurements in milliliters when filled with liquid, the first end of the tube being closed by a member having a flat base extending beyond the sides of the tube whereby the tube may be supported in an upright position on a horizontal surface, said member having a socket receiving said first end in fluid sealing relationship.

2. The device of claim 1, in which said socket has an adjustable collar means for locking said first end in the socket in fluid sealing relationship.

3. A device for teaching and use of metric measurements comprising an elongated tube having opposed open ends, said tube having a uniform cross-section area of ten square centimeters and a length of one meter, means for closing said tube at a first end, a scale extending from said first end to a second open end, said scale starting at zero at the first end and ending at 100 centimeters at the second open end whereby the tube may be used as a linear measure and a volumetric measure to indicate volume in milliliters at scale measurements in milliliters when filled with liquid and a tubular float for additional use for weight measurement of an object receivable on said float, said float being closed at a bottom end and open at a top end, said float having a uniform horizontal cross-section with an outer diameter less than the internal diameter of the elongated tube to be loosely received therein.

4. The device of claim 3, in which guide means are provided on at least one of the interior wall of the elongated tube and the exterior wall of the float to maintain a free-riding buoyancy and vertical position of the float when floated upon a fluid contained in said tube.

5. The device of claim 4, in which said guide means comprise at least three equally spaced circumferentially positioned guide members on the interior of the tube and at least three equally spaced circumferentially positioned guide members on the exterior of the float at the bottom portion thereof.

6. A device for teaching and use of metric measurements comprising an elongated tube having a uniform cross-section area, a scale extending from a first end to a second open end, said scale having graduate metric markings in milliliters, a tubular float positioned within said tube, said float being closed at a bottom end and open at a top end, said float having a uniform horizontal cross-section with an outer diameter less than the internal diameter of the elongated tube to be loosely received therein, said tube being useable as a volumetric measure to indicate volume in milliliters at scale measurements in milliliters when filled with liquid and being further useable for weight measurement of an object when placed on the tubular float.

7. The device of claim 6, in which guide means are provided on at least one of the interior wall of the elongated tube and the exterior wall of the float to maintain a free-riding buoyancy and vertical position of the float when floated upon a fluid contained in said tube.

8. The device of claim 7, in which said guide means comprise at least three equally spaced circumferentially positioned guide members on the interior of the tube and at least three equally spaced circumferentially positioned guide members on the exterior of the float at the bottom portion thereof.

* * * * *